United States Patent [19]

Wang et al.

[11] 4,258,189

[45] Mar. 24, 1981

[54] PROCESS FOR PREPARING ORANGE POLYMERIC COLORANTS

[75] Inventors: Patricia C. Wang, Shanghai, China; Robert E. Wingard, Jr., Palo Alto; Leonard A. Bunes, San Carlos, both of Calif.

[73] Assignee: Dynapol, Palo Alto, Calif.

[21] Appl. No.: 956,304

[22] Filed: Oct. 30, 1978

Related U.S. Application Data

[63] Continuation of Ser. No. 751,855, Dec. 17, 1976, abandoned.

[51] Int. Cl.³ .................... C07D 221/15; C09B 5/42
[52] U.S. Cl. .................... 546/76; 260/45.8 N; 426/250; 426/540; 426/590; 525/336; 525/375; 525/403
[58] Field of Search ......................... 546/76

[56] References Cited

U.S. PATENT DOCUMENTS

| | | | |
|---|---|---|---|
| 3,943,136 | 3/1976 | Ribaldone | 546/76 |
| 4,107,336 | 8/1978 | Oheson et al. | 426/250 |

FOREIGN PATENT DOCUMENTS 964602   7/1964   United Kingdom ............ 546/76

*Primary Examiner*—Donald G. Daus
*Assistant Examiner*—W. B. Springer

*Attorney, Agent, or Firm*—William H. Benz

[57] ABSTRACT

A process for preparing a family of orange polymeric colorants having a plurality of units of the chromophore

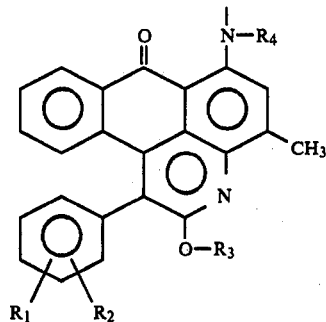

is disclosed. $R_1$ and $R_2$ are hydrogens, lower alkyls or alkoxies, nitros, halos or sulfonates, $R_3$ is benzyl, benzyl sulfonate, lower alkyl or alkyl sulfonate, $R_4$ is hydrogen or lower alkyl. With the disclosed process, the chromophore units, less the $R_3$ substituent, are bonded to an organic polymer backbone. The $R_3$ substituent is added thereafter in a separate second step.

15 Claims, No Drawings

PROCESS FOR PREPARING ORANGE POLYMERIC COLORANTS

This is a continuation of application Ser. No. 751,855, filed Dec. 17, 1976, and now abandoned.

BACKGROUND OF THE INVENTION

1. Field of the Invention

This invention relates to a process for preparing a family of polymeric orange anthrapyridine colorants.

2. Prior Art

Concurrently filed U.S. Patent Application Ser. No. 751,856 abandoned, of Leonard A. Bunes, entitled Orange Colors, discloses a family of new polymeric anthrapyridine colorants. This application of Bunes discloses that these colorants may be found by (1) synthesizing the anthrapyridine chromophore as a halogroup containing intermediate and (2) coupling the anthrapyridine to an amine-group containing backbone. This method has the advantage of offer ng a very pure orange color and clearly a single chromophore species attached to the polymer backbone. It happens, however, that the polymeric version of the immediate precursors to the anthrapyridines (anthrapyridones) are themselves valuable red colorants. The present invention employs this polymeric precursor and makes it possible to efficiently prepare two colorants together with less effort than is required to prepare them independently.

SUMMARY OF THE INVENTION

In accord with this invention a process is provided for preparing a polymeric colorant represented by the structural formula

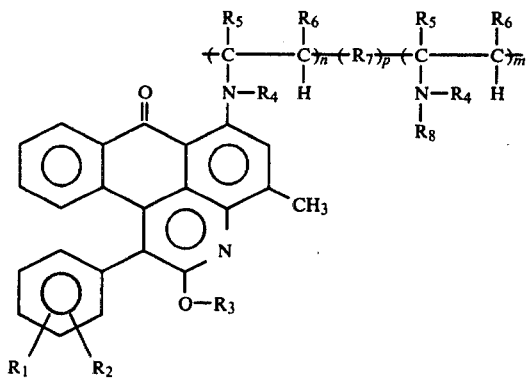

wherein $R_1$ and $R_2$ are independently selected from the group consisting of hydrogen, 1 through 3 carbon alkyls and alkoxies, sulfonate, halos of atomic number 9 through 53 and nitro; $R_3$ is benzyl, benzyl sulfonate, a 1 through 4 carbon alkyl or alkyl sulfonate; $R_4$, $R_5$ and $R_6$ are independently selected from the group consisting of hydrogen, methyl or ethyl; $R_7$ is selected from the group consisting of a carbon-carbon single bond and the ammonium, potassium and sodium salts of ethylsulfonate, ethylphosphonate, acrylic and methacrylic acids, ethyl sulfamate and ethylphosphamate; and $R_8$ is hydrogen or acetyl; which comprises the steps of (a) contacting an amine group-containing polymer

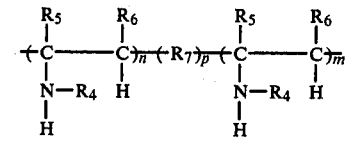

with an anthraquinone selected from

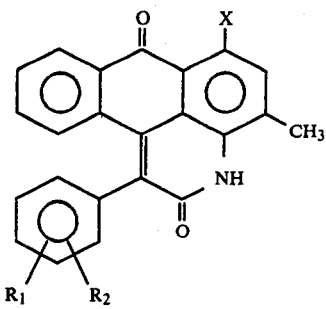

wherein X is Br, I, or Cl, in liquid phase in the presence of a catalytically effective amount of a copper catalyst and at least one mole of inorganic strong base per mole of said anthraquinone at a temperature of from 10° C. to 200° C. for from 0.2 to 24 hours, thereby forming a polymeric red anthrapyridone colorant of the formula

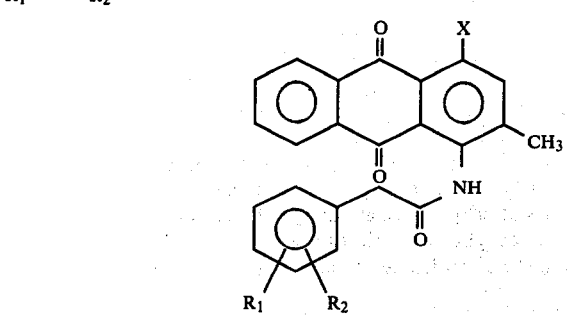

(b) reacting said anthrapyridone colorant in liquid phase with base at room temperature to 50° C. and then O-alkylating said anthrapyridone colorant with an O-alkylating agent capable of introducing a 1 to 4 carbon alkyl of alkylsulfonate $R_3$ substituent onto the anthrapyridone oxygen, thereby forming the desired anthrapyridine colorant.

DETAILED DESCRIPTION OF THE INVENTION

The process of this invention is useful for preparing orange polymeric colorants represented by the formula

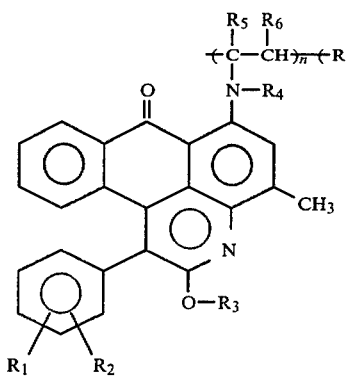

I wherein $R_1$ and $R_2$ are hydrogen, one, two or three carbon alkyls or alkoxies; halos of atomic number 9 through 53, that is, fluoro, bromo, iodo or preferably chloro; nitro, or sulfonate. $R_3$ is benzyl or benzyl sulfonate or a one through four carbon alkyl or alkyl sulfonate. $R_4$, $R_5$ and $R_6$ are hydrogen, methyl or ethyl. $R_7$ is a carbon-carbon single bond, or the $Na^+$, $K^+$ or $NH_4^+$ salts of ethyl sulfonate, ethyl phosphonate, acrylic acid, methacrylic acid, ethyl sulfamate or ethyl phosphamate, and $R_8$ is hydrogen or acetyl and n, m and p are numbers.

The process is particularly valuable for preparing compounds of this formula wherein $R_1$ and $R_2$ are both H or those wherein $R_1$ is H and $R_2$ is chosen from those substituents set forth in Table I.

TABLE I

| Substituent | Ring Position |
|---|---|
| —Cl | 2 or 4 |
| —Br | 2 or 4 |
| —SO$_3$—M$^+$* | 4 |
| —NO$_2$ | 2 or 4 |
| —O—CH$_3$ | 4 |
| —O—C$_2$H$_5$ | 4 |
| —CH$_3$ | 4 |

*M = NH$_4$, Na or K or the like.

The process is especially useful to form polymeric colorants wherein $R_1$ is H and $R_2$ is H or chloro or methoxy at the 2 or 4 position on the phenyl ring.

Representative polymeric backbones represented by

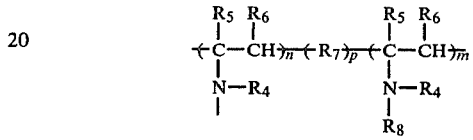

in formula (I), above, are set forth in Table II along with the corresponding polymeric color which they yield.

Among backbones, polyvinylamine and copoly(vinylamine/vinylsulfonate), either acetylated or unacetylated, are preferred. These preferred backbones preferably have molecular weights of about 10,000 to about 200,000 Daltons and, in the case of the polymer, an amine to sulfonate ratio of from 1:1 to 3:1. A polyvinylamine meeting this molecular weight range h

TABLE II

| Backbone | Polymeric Color |
|---|---|
| polyvinylamine | $\pm$CH—CH$_2$$)_{\overline{n}}$$\pm$CH—CH$_2$$)_{\overline{m}}$<br>  \|         \|<br>  NH      NH$_2$<br>  \|<br>  Chrom.*<br>n = 10 to 4000, preferably 100 to 20<br>m = 0.3 to 5n |
| polyvinylamine with acetylated residual amines | $\pm$CH—CH$_2$$)_{\overline{n}}$$\pm$CH—CH$_2$$)_{\overline{m}}$<br>  \|         \|<br>  NH      NHAc<br>  \|<br>  Chrom. |
| copoly(vinylamine/ vinylsulfonate) (shown in sodium form) (other alkaline metals will work) (amine can be 1 to 3 carbon N-alkyl amine as well) | $\pm$CH—CH$_2$$)_{\overline{n}}$$\pm$CH—CH$_2$$)_{\overline{p}}$$\pm$CH—CH$_2$$)_{\overline{m}}$<br>  \|         \|              \|<br>  NH      SO$_3^-$$^+$Na   NH$_2$<br>  \|<br>  Chrom.<br>n = 10 to 2000<br>m = 0.3 to 5n<br>p = 0.3 to 2 (n+m) |
| copoly(vinylamine/vinyl sulfonate) with acetylated residual amines. | $\pm$CH—CH$_2$$)_{\overline{n}}$$\pm$CH—CH$_2$$)_{\overline{p}}$$\pm$CH—CH$_2$$)_{\overline{m}}$<br>  \|         \|              \|<br>  NH      SO$_3^-$$^+$Na   NHAc<br>  \|<br>  Chrom. |
| poly N-methylvinylamine (other N-lower alkyl amines can be used as well) | $\pm$CH—CH$_2$)$_n$ (CH—CH$_2$$)_{\overline{m}}$<br>  \|              \|<br>  N—CH$_3$   N—CH$_3$<br>  \|              \|<br>  Chrom. |

TABLE II-continued

| Backbone | Polymeric Color |
|---|---|
| copoly(vinylamine/ acrylic acid) (amines can be acetylated as well) | $+CH-CH_2)_n+CH-CH_2)_m+CH-CH_2)_p$<br>　　\|　　　　　\|　　　　　\|<br>　NH　　　NH$_2$　　COOH<br>　\|<br>Chrom. |
| sulfamated polyvinylamine or N-methylvinylamine or the like | $+CH-CH_2)_n+CH-CH_2)_m+CH-CH_2)_p$<br>　　\|　　　　　\|　　　　　\|<br>　NR　　　　NR　　　　NR<br>　\|　　　　　\|　　　　　\|<br>Chrom.　　　H　　　SO$_3$—Na$^+$ |
| R = lower alkyl of 1 to 3 carbons or hydrogen (secondary alkyl and primary amines can be acetylated) | |
| aminated poly(epichloro- hydrin) (with added sulfamates | $+CH-CH_2-O)_m+CH-CH_2-O)_m+CH-CH_2-O)_p$<br>　　\|　　　　　　\|　　　　　　\|<br>　NH　　　　　NH$_2$　　　　NH<br>　\|　　　　　　　　　　　　\|<br>Chrom.　　　　　　　　　SO$_3$—$^+$Na |
| aminated and acetylated poly(epichlorohydrin) | $+CH-CH_2-O)_n+CH-CH_2-O)_m$<br>　　\|　　　　　　\|<br>　NH　　　　　NHAc<br>　\|<br>Chrom. |

*Chrom. equals

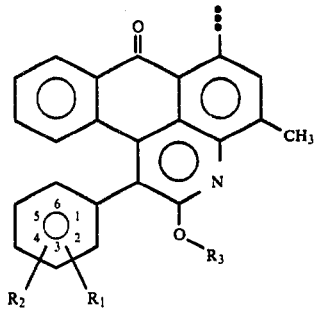

from about 200 to about 3,000 units, a copolymer—from about 60 to about 1,800 amine units. The choice among backbones often depends upon the degree of water solubility required of the final polymer colorant product. Polar groups such as carboxyls, phosphonates, sulfamates, and especially sulfonates are required in the polymeric colorant to impart good water solubility properties. When the color unit itself contains sulfonates, i.e., when $R_1$, $R_2$, $R_3$ are sulfonate-containing moieties, it is not always necessary to have these polar groups attached to the backbone as well. When the color unit does not contain sulfonate $R_1$, $R_2$, or $R_3$, good water solubilities, i.e., solubility in pH 7 room temperature water of at least 1,000 ppm, are achieved only when a backbone containing polar groups—such as the copolymer backbones—is employed.

In the first step of the process of this invention, an amine group-containing polymer represented by the formula

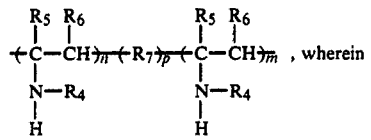

wherein $R_4$, $R_5$, $R_6$, $R_7$, m, n and p are set forth hereinbefore, is reactively contacted in the liquid phase with an anthraquinone represented by the formula

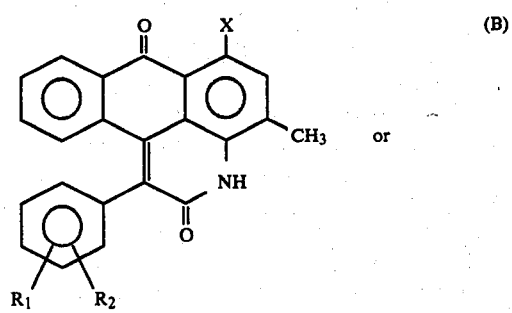

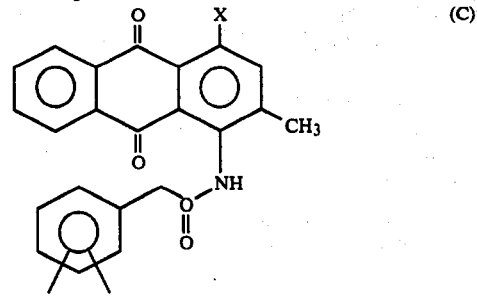

wherein $R_1$ and $R_2$ are as set forth hereinbefore and X is chloro, bromo or iodo. The reaction takes place in the presence of a catalytically effective amount of a suitable catalyst and at least one mole of an inorganic base so that the amine displaces the halo leaving group on the anthraquinone ring as follows:

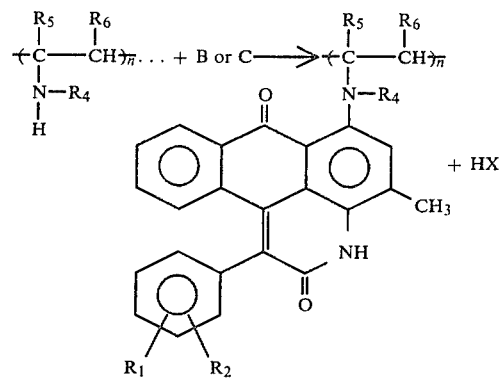

When material C is used, the conditions of coupling also function to cyclize C to B. The product (D) is a polymeric red colorant.

This step is carried out in liquid phase, generally in a water or mixed water/organic solvent and base and with a copper catalyst. This amine displacement is an adaption of the classic Ullmann condensation.

Solvents include water, and water containing up to about 25% of a water-miscible organic, such as an alkanol or glycol (methanol, ethanol, ethylene glycol and the like), mono and dialkyl ethers of ethylene glycols such as the materials marketed by Union Carbide under the trademark Cellosolve ®, and liquid organ: bases such as pyridine. Water and water containing up to about 20% pyridine are preferred solvents. The copper catalyst useful for this coupling may be copper metal, a copper (preferably cuprous) salt or an oxide of copper, for example, finely divided copper metal, $Cu_2Cl_2$ and $Cu_2O$ supported on carbon black. A catalytically effective amount of catalyst is employed. Such an amount can range from about 0.01 to about 0.5 equivalents (preferably 0.05 to 0.4 equivalents) of copper per equivalent of coupling desired. Base, especially a strong inorganic base such as NaOH or KOH, should be present in an amount in excess of the molar amount of chromophore being coupled. Preferably from 0.5 to 5 equivalents (basis free amine) of base is present with amounts from 1 to 3 (especially about 2) equivalents giving best results. The coupling is effected at a temperature of from about 60° C. to about 200° C., preferably 80° C. to about 150° C., and a time of from about 0.2 hours to about 24 hours, preferably 0.5 hours to about 8 hours. This yields the coupled product (D).

In the next step of this process, the $R_3$ component is attached while simultaneously aromatizing the fused pyridone ring, that is, converting it to a pyridine structure. This step is an "O-alkylation" reaction and proceeds mechanistically as follows:

First, the pyridone oxygen is converted to an enolate type anion (alkoxide) by the action of base

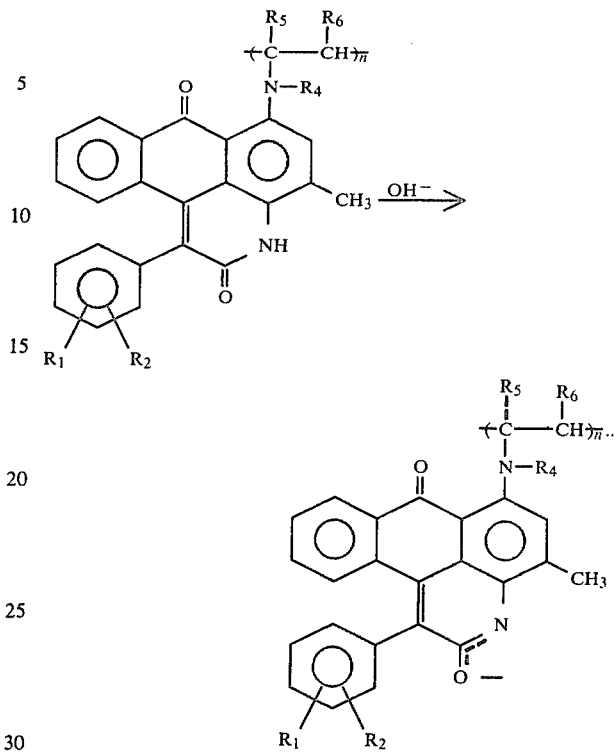

This step is carried out in liquid phase in a solvent suitable for the polymeric red dye. If $R_1$ is sulfonate, or if the backbone contains $-SO_3^\ominus$ groups, water may be used. In other cases, a less polar inert liquid is required to dissolve the polymer with $H_2O$-organics, i.e., $H_2O$-glycol, $H_2O$-DMF, sulfolane-HMPA and N-methylpyrrolidone being examples of the class of useful solvents. This generation of enolate type anions requires that a base be present. While any base capable of achieving a pH of 10 or greater may be used, as may any amount of base from the stoichiometric requirement to large excesses, there are good reasons to control the kind and amount of base employed. It is generally best to use from about 1.0 to about 1. moles of base per mole of alkoxide ion desired with amounts from 1.01 to about 1.2 moles of base per mole of alkoxide ion being preferred.

Suitable bases include the alkali metal hydroxides carbonates and mixtures thereof with $K_2CO_3$, $Na_2CO_3$, NaOH and KOH being preferred. The carbonates and mixtures of carbonates and hydroxides which maintain the pH at 12 or less, i.e., from 10–12, are generally preferred since higher pH's such as 13–14 can wastefully consume alkylating agent. This is not critical to the chemical success of this reaction. If one is prepared to accept alkylating agent losses, higher pH's and large excesses of base can be employed. The enolate type anion formation may be carried out quickly with for from a few (10) seconds to a few (6) hours elapsing between the addition of base and the addition of alkylating agent. The period is not considered critical. Temperatures of from room temperature to elevated temperatures such as 100° C. may be used.

Once the enolate type anion is formed, an alkylating agent is added. This addition can take place simultaneously with the generation of enolate type anion subject to the limitation that the base will gradually consume unreacted alkylating agent. Thus, it is often preferable to add the alkylating agent after the enolate type anion formation is essentially complete. This reaction is carried out at 25° to 150° C., preferably 50° to 100° C. for from 0.1 to 2 hours.

Any agent which can add the desired $R_3$ benzyl, alkyl or alkylsulfonate may be employed as alkylating agent. When $R_3$ is to be lower alkyl, the corresponding bromo or iodo alkanes, such as methylbromide, ethylbromide, n-propylbromide, butylbromide and the iodide equivalents may be used as may dialkylsulfates such as dimethylsulfate, diethylsulfate, dipropylsulfate and dibutylsulfate. When $R_3$ is to be a lower alkylsulfonate, the sultones such as propane sultone and 1,4-butane sultone and the halosulfonates such as 2-chloro, bromo or iodoethylsulfonate, 3-chloro, bromo or iodo propylsulfonate or 4-chloro, bromo or iodobutylsulfonate may be used. When $R_3$ is benzyl or benzyl sulfonate, the corresponding benzylhalides, e.g., chloride, may be used. This list is far from exhaustive. The art is replete with other equivalent agents which could be substituted for these materials, if desired.

The amount of alkylating agent is generally controlled. Many of these materials, for example, propane sultone, are reactive and potentially dangerous. Use of large excesses of these materials can give rise to contamination and side reactions. Accordingly, it is generally desirable to use from about 0.9 to about 1.2 moles of alkylating agent for each mole of alkylation theoretically desired. This is not critical and is not a limitation. One could use larger amounts if one were prepared to effect the required purifications and accept the loss of excess alkylation agent. Preferred ratios are from about 0.95 to 1.00 mole of alkylating agent per mole of alkylation desired.

Optionally, and generally preferably, the polymeric colorants may be acetylated. Acetylation converts residual alkyl amine groups to amides. This step is disclosed fully in copending U.S. Patent Application Ser. No. 743,205 of Wingard et al., filed Nov. 18, 1976, now U.S. Pat. No. 4,169,203 and as shown in the examples. It generally is employed prior to alkylation. It improves the acid solubility of the polymeric colorants and renders the residual amine groups unreactive to the alkylating reagent employed.

Following O-alkylation or acetylation and alkylation the polymeric colorant is recovered and freed of low molecular weight impurities. This can be accomplished by ultrafiltration or more common means, such as precipitation and the like. This results in a purified polymeric colorant which, when employed in foods, is essentially not absorbed through the walls of the G.I. tract.

The following preparations are given as exemplary of methods of preparing starting materials, i.e., (B) and (C) which are useful in the process of this invention.

PREPARATION I

A. Formation of a copolymer of vinyl sulfonate and vinyl acetamide.

This preparation sets forth procedures for the preparation of amine-group-containing polymers useful as a starting material in the process of this invention. To 2,304 g of acetamide (technical) in a 12 liter reaction flask is added 62.2 ml of 6 M aqueous sulfuric acid followed immediately by 661 g of acetaldehyde (99+%). This mixture is stirred and heated until the internal temperature reaches 78° C. (11 minutes) at which point the clear solution spontaneously crystallizes, causing a temperature rise to 95° C. The reaction product, ethylidene-bis-acetamide, is not separated. Heating and stirring are continued for another five minutes to a temperature of 107° C. and a mixture of 150 g calcium carbonate (precipitated chalk) and 150 g of Celite ® diatomaceous earth powder is added. A first distillate fraction of water and acetamide is removed. The remaining materials are cracked at 35 mm Hg and 185° C. A fraction made up of vinylacetamide and acetamide is taken overhead, analyzed by NMR and found to contain vinylacetamide and acetamide. A portion of this pooled material is dissolved in isopropanol, cooled, and filtered to yield a stock solution. This stock solution is analyzed and found to be 4.1 molar in vinylacetamide.

Into a five liter flask is added 505 ml (272 g) of a vinylacetamide solution obtained by stripping isopropanol from 900 ml of the above stock solution (containing 3.69 moles of vinylacetamide). AIBN (15 g) in 1,500 ml of water is added followed by 1,279 g of 25% W sodium vinylsulfonate in water (Research Organic Corporation) and a liter of water. This is two equivalents of sulfonate per three equivalents of vinyl-acetamide. Following deoxygenation, the mixture is heated to 65° C. and there maintained with stirring for three hours. This reaction mixture is then reduced to ⅔ volume, solid AIBN is removed and the liquid added to eight gallons of isopropanol. The copolymer precipitate is collected and dried in vacuum to yield 865 g of solid copolymer (MW $6.6 \times 10^4$). Whenever an experimental molecular weight is given in this specification, it is derived by gel permeation techniques. In the primary technique, a silanized porous glass support is used with a 0.01 M LiBr in DMF eluent. Detection is by refractometer with standardization being based on suitable purchased poly(styrene) or poly(styrene sulfonate) standards.

Into a two liter flask is added 863 g of the justnoted solid product, 2.5 liters of water and a liter of concentrated hydrochloric acid. The mixture is refluxed (99°-110° C.) for about 24 hours and cooled. The solid precipitate is washed, and dissolved in three liters of 10% NaOH. This mixture is added to about 12 liters of methanol to give 400 g of fine, solid copolymer precipitate.

B. Formation of a homopolymeric polyaminoethylene (PAE) backbone for coupling colors into polymeric form.

A red-brown solution of 460 g of vinylacetamide, 557 g acetamide, and 123 g ethylidene-bis-acetamide, (one-half of five combined vinylacetamide preparations essentially in accord with Example III) in 570 ml methanol is filtered through 250 g of Amberlite ® IRC-50 ion exchange resin over an eight-hour period. The column is rinsed with 1,000 ml methanol. The combined column eluent is stripped to its original volume of 1,667 ml, treated with 7.75 g of AIBN polymerization catalyst (1 mole %), deoxygenated, and stirred under Argon at 65° C. for 15 hours to polymerize. Solid polymer is precipitated from the resulting very thick solution by addition to 15 liters of acetone. The polymer is collected by filtration, washed with acetone and dried in a vacuum oven (80° C.) for two days to afford 459 g of crude poly(vinylacetamide) contaminated with acetamide as a yellow, semigranular solid having molecular weight of $2 \times 10^5$ as determined by Gel Permeation Chromatography, using dimethylformamide as eluent and polystyrene as standards.

The crude poly(vinylacetamide) (459 g) is dissolved in 1,000 ml water with heating. Concentrated hydrochloric acid (1,000 ml) is added and the resulting dark brown solution is stirred and heated at a gentle reflux (97°–106° C.) for 19 hours. A precipitate forms and is redissolved by addition of 200 ml water. Reflux is continued and over the next eight hours 1,000 ml water is added in several portions to maintain solubility of the polymer. After a total of 27 hours at reflux, the polymer is precipitated by the addition of 1,000 ml concentrated hydrochloric acid. The mixture is cooled to 18° C. and the thick polymeric gum isolated by decantation and dried under vacuum at 50°–75° C. with occasional pulverization for 40 hours to give 332 g of poly(vinylamine hydrochloride) as a brown, granular solid (77% yield from vinylacetamide, 59% from acetaldehyde).

PREPARATION II

This preparation sets forth procedures for preparing starting materials represented by the formula

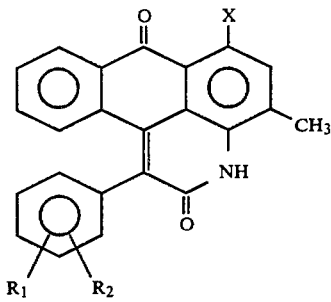

A. Wherein $R_1$ and $R_2$ are hydrogen and X is Br.

(1) 1-amino-2-methylanthraquinone (300 g) is slurried with 1500 ml of HOAc in a 5-liter flask. The temperature is raised to 40° C. Neat bromine (405 g) is added over a 2½ hours with stirring at 40°–50° C. The mixture is stirred for 20 additional minutes and filtered. The solids so recovered are washed with HOAc and water and sucked dry with an aspirator and transferred to a reaction flask along with 150 g of $NaHSO_3$ and 1.5 liters of water. The mixture is gradually heated to 90° C. (over two hours) with stirring to give 1-amino-2-methyl-4-bromoanthraquinone (AMBAX) as a solid which is recovered from the reaction mixture by filtration in 90% yield, rinsed with water and dried overnight at 155° C. and 1 mm Hg absolute vacuum.

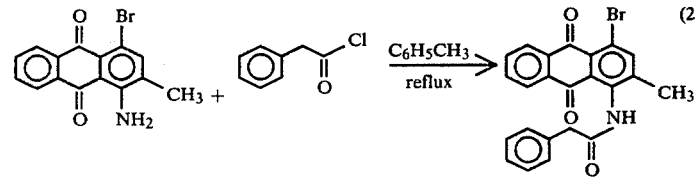

| Wt used | 15.8 g | 8.5 g | 21.7 g (theory) |
|---|---|---|---|
| Moles used | 0.050 | 0.055 | |
| Molar ratio | 1.0 | 1.1 | |

A 250 ml flask, equipped with overhead stirrer, water-cooled condenser, and Ar inlet is charged with the bromoanthraquinone of Part A and 120 ml of toluene. To the red slurry is added the phenylacetyl chloride and the mixture is heated to reflux. The reaction is followed by thin-layer chromatography. After one hour, most of the starting material is gone. After three hours, the reaction is essentially complete although a trace of starting material remains.

After 3.5 hours total reflux, the reaction is cooled to ca. 80° and filtered. The dark yellow filtrate is concentrated to ca. 30 ml on a rotary evaporator and cooled. A large amount of dark solid forms which is isolated and washed with ether until a yellow (dark) solid is obtained. The solid is oven-dried at 70°, <1 mm, for four hours to afford 12.5 g (57.6%) of yellow-green solid product.

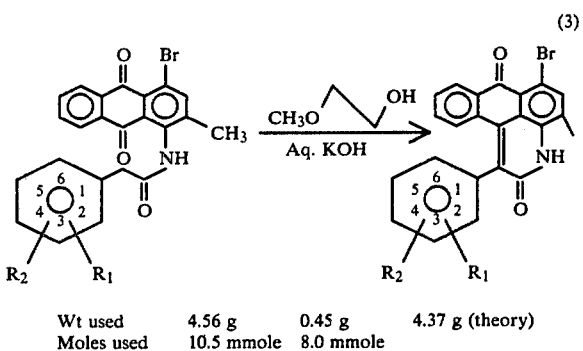

(3)

| | | | |
|---|---|---|---|
| Wt used | 4.56 g | 0.45 g | 4.37 g (theory) |
| Moles used | 10.5 mmole | 8.0 mmole | |

A 100 ml three-necked flask is equipped with water-cooled condenser, overhead stirrer, thermowell, and Ar inlet. The flask is charged with the phenylacetyl product of Part (2), and 30 ml methyl cellosolve. The contents are heated to 122° and the KOH in 0.6 ml $H_2O$ is added dropwise over one minute. The reaction is stirred at 120° for one hour.

The reaction mixture is cooled to about 5° C. Isolation of a solid precipitate, followed by washing, affords 1.71 g (39.1%) of bright, shiny gold solid.

The dark, yellow filtrate is concentrated via rotary evaporator to dryness and the dark solid is recrystallized from 170 ml of HOAc to afford 2.3 g (52.6%) of a dull, golden colored powder. Total yield is 4.01 g (91.8%).

B. Compound wherein X is bromo, $R_1$ is hydrogen and $R_2$ is 4-chloro.

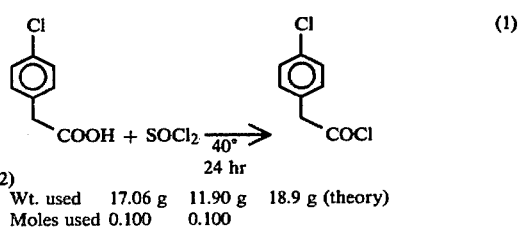

(1)

(2)
| | | | |
|---|---|---|---|
| Wt. used | 17.06 g | 11.90 g | 18.9 g (theory) |
| Moles used | 0.100 | 0.100 | |

A 50 ml flask is charged with the organic acid and the SOCl₂. A single boiling chip is added and the flask fitted with air condenser and drying tube. Heating in a 45° oil bath is begun. The reaction is cooled after 23 hours.

To the solution is added 5 ml of benzene. Volatile material is pumped off at room temperature at 0.5 mm Hg. The product is then distilled through a short path vacuum distillation apparatus as a water white product, b.p. 63°–64° at 0.10 mm Hg. The yield of distilled product is 12.3 g (65%).

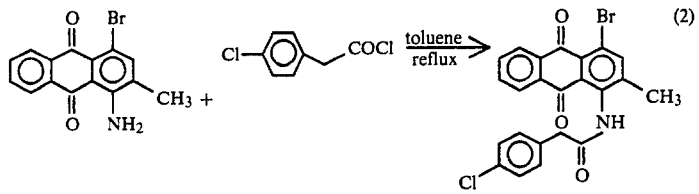

| | | | |
|---|---|---|---|
| Wt. used | 15.8 g | 16.87 g | 120 ml | 23.4 g (theory) |
| Moles used | 0.050 | 0.0575 | | |
| Molar ratio | 1.0 | 1.35 | | |

The procedure of this preparation, Part (2), is repeated using the above materials to afford the above product.

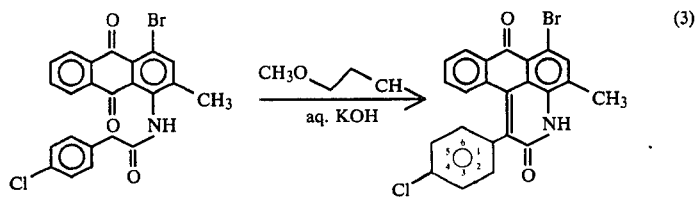

| | | | |
|---|---|---|---|
| Wt. used | 9.85 g | 0.88 g | 9.46 g (theory) |
| Moles used | 0.021 | 0.0157 | |
| Ratio | 1.0 | 0.75 | |

The product of Part (2) and 60 ml of Cellosolve ® are added to a 250 ml flask. The slurry is heated to 123°. The KOH is dissolved in 1.0 ml H₂O and added over one minute. The reaction is cooled after heating at 115° for 35 minutes. The mixture is allowed to cool slowly to room temperature and then cooled to 5° C. A solid precipitate is isolated and washed to afford 3.32 g of glittering, brownish/golden crystals.

The dark filtrate is concentrated to dryness and the resultant dark solid recrystallized from 675 ml boiling HOAc. The greenish-yellow needles are isolated and washed. Drying at 85°, <1 mm for four hours, affords 3.8 g of a golden solid.

C. Compound wherein X is bromo, R₁ is hydrogen and R₂ is 4-methoxy.

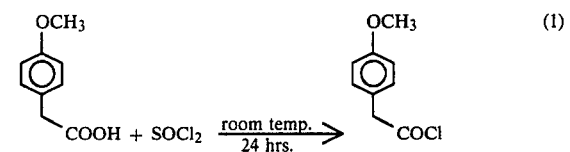

| | | | |
|---|---|---|---|
| Wt. Used | 16.61 g | 11.90 g | 18.4 g (theory) |
| Moles Used | 0.100 | 0.100 | |

A flask is charged with the carboxylic acid and thionyl chloride and allowed to stand at room temperature with occasional swirling for 24 hours. The endothermic reaction begins immediately and proceeds at a very good rate, generating an orange solution.

After 24 hours, nearly all gas evolution has ceased. Six ml benzene is added and the volatile material is removed with vacuum. The product is purified by distillation.

(2) A flask is charged with 15.8 g AMBAX and 115 ml toluene. Then, the acid chloride, 10.1 g. is added. The red slurry is heated to reflux for 2.0 hours.

The hot mixture is filtered and a black residue washed with three portions of hot toluene. The toluene is stripped off affording a solid which is washed with ether. The product is dried overnight at 70°, <1 mm to afford 19.48 g of dull green powder.

This product is treated with base according to the procedures of Part A (3) to yield

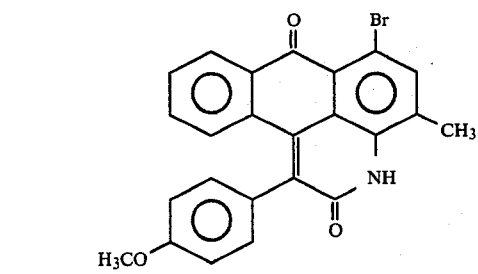

D. Compound wherein X is bromo, R₁ is H, and R₂ is 2-nitro.

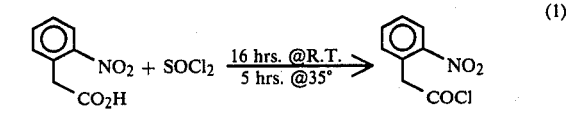

| | | | |
|---|---|---|---|
| Wt. Used | 18.11 g | 12.0 | 19.9 (theory) |
| Moles Used | 0.100 | 0.101 | |

The reagents are weighed into a flask and allowed to stand at room temperature (~21°) overnight. A stirring bar is added and the reaction driven to completion by warming at 35° until no solid is visible (five additional hours). To the red solution is added 5 mls benzene and the volatile material is removed with vacuum.

(2) The above crude 2-nitrobenzoyl chloride is reacted with AMBAX and the ring is closed according to Part A(2) and (3) to give the product

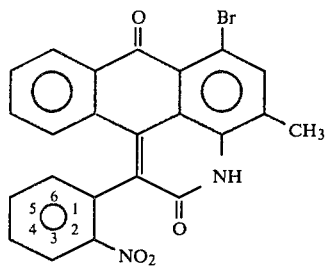

The reaction of this acid chloride with AMBAX is more facile and requires only three hours at reflux.

E. The compound wherein X is bromo, $R_1$ is H and $R_2$ is $-SO_3^-NH_4^+$, principally in the 4-position.

The product of Part A (0.6 g), i.e., wherein $R_1$ and $R_2$ are both H and X is bromo, and 4.4 g of 20% oleum are stirred together at room temperature. After one-half hour, it appears that reaction has occurred. The stirring is continued for a total of five hours. The reaction mixture is poured over ice and water and a solid precipitate forms and is collected. The solid is dissolved in a liter of 2 M $NH_4OH$, filtered and the solution is evaporated to dryness. The solid which results is extracted with methanol. The methanol is evaporated to afford 0.775 g of the desired sulfonate product.

F. A compound wherein X is bromo, $R_1$ is H and $R_2$ is 2-chloro.

By following in principle the procedure of Part A (1-3) of this Preparation, but substituting 2-chlorophenylacetylchloride for phenylacetylchloride, a compound is prepared which is represented by the above formula in this Preparation wherein X is Br, $R_1$ is H and $R_2$ is 2-Cl.

G. A compound wherein X is bromo and $R_1$ and $R_2$ is 2,4-dichloro.

By following in principle the procedure of Part A (1-3) of this Preparation, but substituting 2,4-dichlorophenylacetyl chloride for phenylacetylchloride, a compound is prepared which is represented by the above formula in this preparation wherein X is Br and $R_1$ and $R_2$ are 2,4-dichloro.

H. Other compounds suitable as starting materials wherein $R_1$ and $R_2$ are independently hydrogen, alkyl of 1-3 carbons, alkoxy of 1-3 carbons, sulfonate, chloro, bromo, iodo, fluoro or nitro may be prepared by following in principle the process of Part A (1-3) of this Preparation but substituting the appropriately substituted phenyl acetylchloride for phenylacetylchloride.

I. 1-amino-2-methyl-4-chloroanthraquinone is prepared according to the procedure of Part A (1) but substituting chlorine for bromine. By following in principle the procedures set forth in Parts A-H but substituting the chloroanthraquinone for the bromoanthraquinone, the corresponding compound wherein X is chloro is obtained.

PREPARATION III

This Preparation sets forth procedures for making compounds represented by the formula

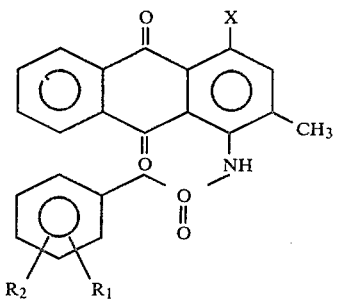

By reacting a 1-amino-2-methyl-4-haloanthraquinone as set forth in Preparation II, Part A (1) or Part I with a suitably substituted phenylacetylchloride according to the procedure of Preparation II, Part A (2), the corresponding 1-substituted phenylacetylamino-2-methyl-4-haloanthraquinone is prepared wherein $R_1$, $R_2$ and X may be as set forth in Part A-H of Preparation II.

The following Examples are given to further explain how to perform the process of this invention. These examples are presented as representative of specific procedures of the process of this invention and are not to be interpreted as limiting the scope of the claims set forth hereafter.

EXAMPLE I

Formation of an orange polymeric colorant by the process of this invention.

(1) Formation of red colorant precursor.

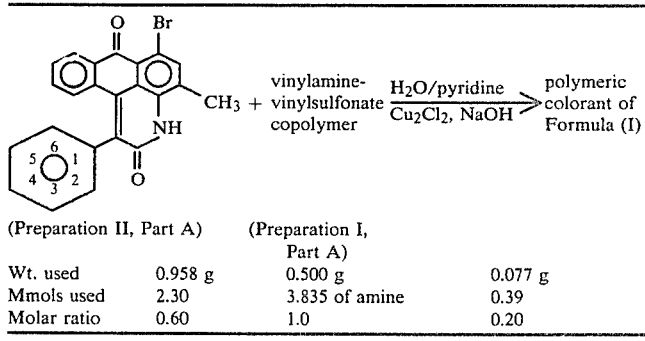

|  | (Preparation II, Part A) | (Preparation I, Part A) |  |
|---|---|---|---|
| Wt. used | 0.958 g | 0.500 g | 0.077 g |
| Mmols used | 2.30 | 3.835 of amine | 0.39 |
| Molar ratio | 0.60 | 1.0 | 0.20 |

A 50-ml two-necked flask is charged with the copolymer, 11.5 ml 1 N NaOH, 1 ml of pyridine and 4 ml $H_2O$. The system is de-aerated. The polymer dissolves and the anthrapyridone and Cu₂Cl₂ are added and the mixture is heated to 97°. After 2½ hours, the mixture is cooled and diluted with 40 ml water at pH 11.

The diluted mixture is filtered to afford 100 ml of a red solution. The solution is ultrafiltered using 10% pyridine in water at pH 11 and later pH 7 water as make-up.

The red solution is lyophilized to afford 0.850 g of red solid which is determined to be

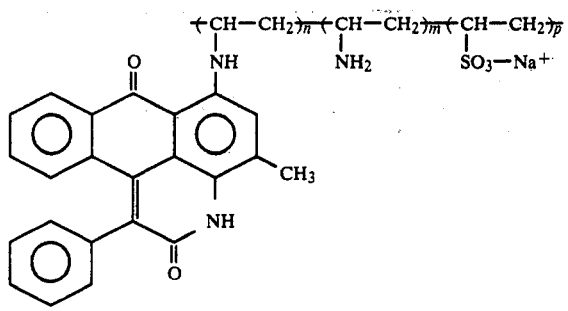

wherein n+m+p equals about 900.

n= ~180 m= ~360 p= ~360.

(2) Acetylation of residual backbone amines. The product of Part 1 is dissolved in 50 ml of water. Fifty percent NaOH is added to pH 12. The mixture is cooled to 0° C. and 1.5 g of acetic anhydride are added gradually along with base to hold the pH at 12. The red solution is filtered, ultrafiltered and lyophilized to yield a solid product of Part 1 wherein about 95% of the residual backbone amines are converted to amides.

(3) Formation of the enolate type anion intermediate and O-alkylation.

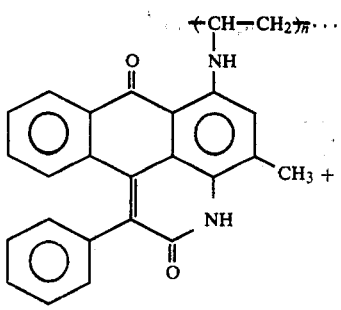

(C')

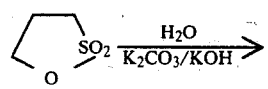

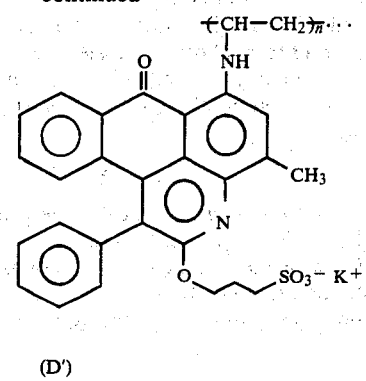

(D')

A 250 ml, 3-necked flask, fitted with an argon inlet and magnetic stirrer, is charged with 100 ml H₂O, 3.6 g of the red solid from step (2) (5 mmoles of chromophore) and enough 2.5 N KOH solution to afford a pH of 11 is added. The system is de-aerated with argon. The solution is stirred at room temperature. The propane sultone, 5 mmole (0.61 g), is added. The reaction mixture is held at room temperature for six hours and then heated to 40° C. for three hours. During this time period the pH is maintained at 10.5-11.0 by the addition of 2.5 N KOH solution as necessary. After cooling, the crude orange dye solution is ultrafiltered and lyophilized. This gives the orange polymeric colorant product where n, m and p are as defined.

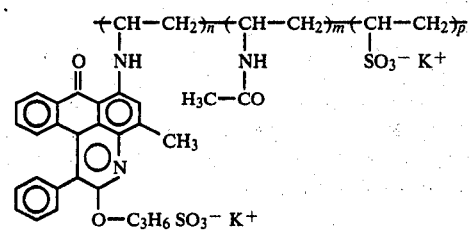

Similarly, by substituting the 1,4-butane sultone for propane sultone, one obtains the orange colorant of the formula

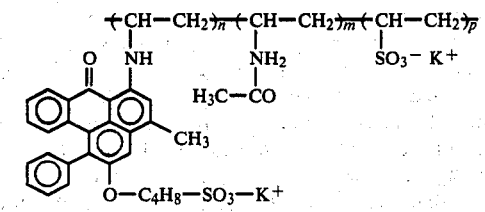

In both this case and wherein propane sultone is used, a few (5% or so) of the residual amines may be in an alkylated state as well. These are excellent orange colors which find application as nonabsorbable food colorants.

EXAMPLE II

Colorants similar to the colorant of Example I would result when the following changes are made in the preparation of Example I.

1. The backbone amine to sulfonate ratio is varied from 1.1:1 to 2.0:1.

2. The backbone peak molecular weight is varied from 35,000 to 80,000.

3. The fraction of total backbone amines substituted with chromophores is varied from 25% to 40%.

4. The degree of acetylation is varied between 80% to 98% of the total amines not substituted with chromophore groups.

EXAMPLE III

By following in principle the procedure set forth in Example I, but substituting methyl bromide or iodide for propane sultone, another compound of this invention represented by Formula (I) is prepared wherein the polymeric backbone is the homopolymer or copolymer of Preparation IA or IB and $R_3$ is methyl while $R_1$ and $R_2$ are both H. The corresponding compounds wherein $R_3$ is ethyl, n-propyl, isopropyl, or n-butyl, are obtained by using the corresponding alkyl iodide or bromide in place of methyl bromide or iodide. Each product may be acetylated according to the procedure set forth in Example II. Orange colorants having other substituents for $R_1$ and $R_2$ are obtained by employing the starting materials set forth in Preparation II, B-I, according to the procedure of Example I.

EXAMPLE IV

By following in principle the procedure set forth in Example I, but substituting dimethyl sulfate for propane sultone, another compound of this invention represented by Formula (I) is prepared wherein the polymeric backbone is the copolymer or homopolymer of Preparation IA or IB and $R_3$ is methyl while $R_1$ and $R_2$ are both H. The corresponding compounds wherein $R_3$ is ethyl, n-propyl, isopropyl, n-butyl, l-butyl or isobutyl are obtained by using the corresponding dialkyl sulfate in place of dimethyl sulfate. Each product may be acetylated according to the procedure set forth in Example II. Orange colorants having other substituents for $R_1$ and $R_2$ are obtained by employing the starting materials set forth in Preparation II B-I, according to the procedure of Example I.

EXAMPLE V

By following in principle the procedure set forth in Example I, but substituting 2-chloroethylsulfonate (or the 2-bromo or 2-iodo compound) or its corresponding $NH_4^+$ or alkali metal salt for propane sultone, another compound of this invention represented by Formula (I) is prepared wherein the homopolymer or copolymer of Preparation I.A. or I.B. and $R_3$ is ethyl while $R_1$ and $R_2$ are both H. The corresponding compounds wherein $R_3$ is n-propylsulfonate, or n-butyl sulfonate or the corresponding alkali metal salts are obtained by using the corresponding 3-halopropylsulfonate or 4-halo-n-butylsulfonate in place of 2-chloroethyl sulfonate. Each product may be acetylated according to the procedure set forth in Example II. Orange colorants having other substituents for $R_1$ and $R_2$ are obtained by employing the starting materials set forth in Preparation II.B-I according to the procedure of Example I.

EXAMPLE VI

This example shows the alternative method wherein the formation of the anthrapyridone and attachment of the chromophore to a backbone steps are carried out together.

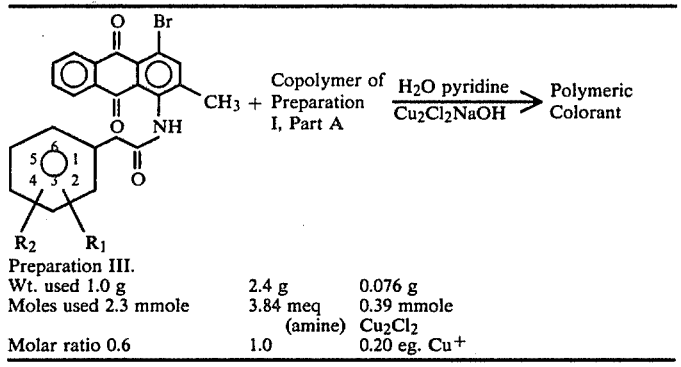

| Preparation III. | | |
|---|---|---|
| Wt. used 1.0 g | 2.4 g | 0.076 g |
| Moles used 2.3 mmole | 3.84 meq (amine) | 0.39 mmole $Cu_2Cl_2$ |
| Molar ratio 0.6 | 1.0 | 0.20 eg. $Cu^+$ |

A 25 ml flask is charged with the anthraquinone derivative, the copolymer backbone, 11.5 mls 1 N NaOH solution, 1.3 ml pyridine, and the cuprous chloride. The flask is equipped with reflux condenser, magnetic stirrer, and thermocouple. The system is then de-aerated and flushed with argon. The reaction mixture next is stirred and heated at 96°–100° C. for 3.5 hours, after which time the reaction mixture is cooled, diluted, filtered, and ultrafiltered. The resultant dye is then acetylated and O-alkylated with propane sultone in accord with the principles of Example I, Part 2, to afford an orange dye which is indistinguishable from the dye prepared according to Example I.

What is claimed as the invention is:

1. A process for preparing a polymeric orange colorant represented by the structural formula

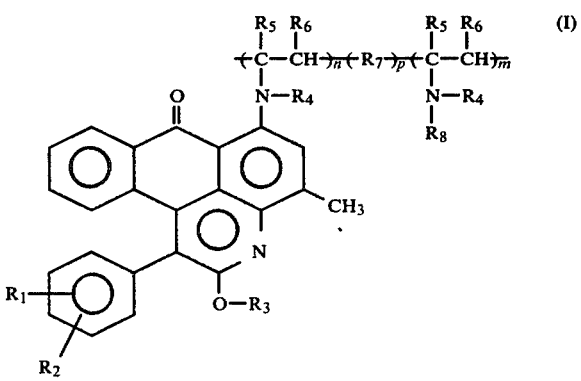

wherein $R_1$ and $R_2$ are independently selected from the group consisting of hydrogen, alkyl of 1 through 3 carbon atoms, alkoxy of 1 through 3 carbon atoms, sulfonate, halogen, and nitro; $R_3$ is selected from among methyl, ethyl and the alkali metal salts of n-propyl sulfonate; $R_4$, $R_5$ and $R_6$ are independently selected from the group consisting of hydrogen, methyl and ethyl; $R_7$ is selected from the group consisting of ethylene, ethylene sulfonate, ethylene phosphonate, ethylene phosphamate, ethylene sulfamate, acrylate and methacrylate; $R_8$ is hydrogen or acetyl; n is 10 to 2000; m is 0.3n to 5n; and p is 0 to 2(n+m), which process comprises the steps of (a) contacting an amine group containing polymer represented by the formula

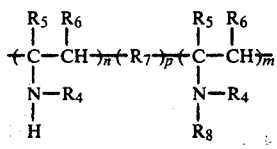

wherein $R_4$, $R_5$, $R_6$, $R_7$, m, n, and p are as previously defined and $R_8$ is hydrogen with an anthraquinone selected from those of the group represented by the formulae

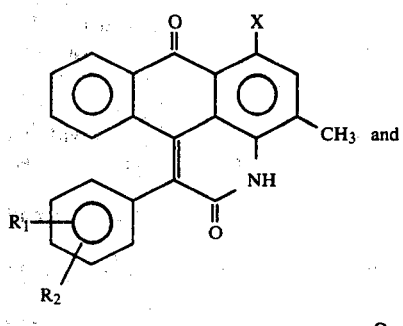

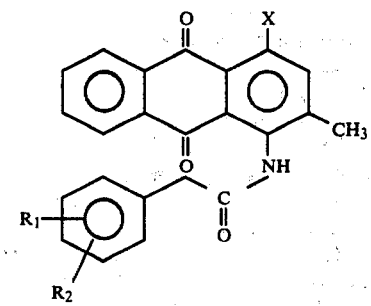

wherein $R_1$ and $R_2$ are as previously defined and X is bromo, chloro or iodo in the liquid phase in the presence of a catalytically effective amount of a copper catalyst selected from among copper metal, copper salts and copper oxides and at least one mole of a strong, inorganic base selected from among KOH and NaOH per mole of said anthraquinone at a temperature of about 60° C. to about 200° C. for about 0.2 to about 24 hours to form a polymeric red colorant represented by the formula

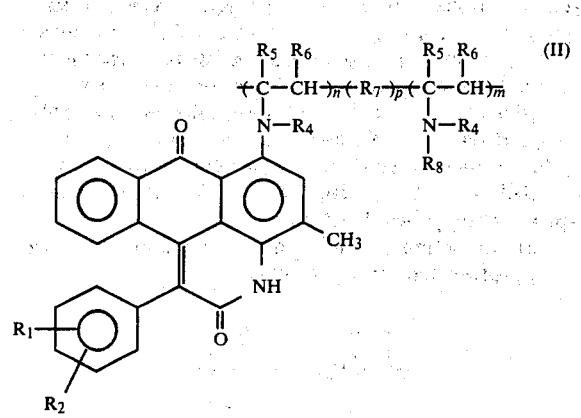

wherein $R_1$, $R_2$, $R_4$, $R_5$, $R_6$, $R_7$, m, n and p are as previously defined and $R_8$ is hydrogen, (b) Optionally reacting the product of step (a) with an acetylating agent to form red polymeric dye of formula (II) wherein $R_1$, $R_2$, $R_4$, $R_5$, $R_6$, $R_7$, m, n and p are as previously defined and $R_8$ is acetyl, (c) Reacting the product of step (a) or (b) in aqueous liquid phase with inorganic base selected from among alkali metal carbonates and hydroxides, (d) Reacting the product from step (c) in an aqueous reaction medium selected from among water and water containing up to 25% of a water-miscible organic with an agent to form a polymeric colorant represented by formula (I) wherein $R_1$, $R_2$, $R_3$, $R_4$, $R_5$, $R_6$, $R_7$, $R_8$, m, n and p are previously defined, said agent selected from the group consisting of dimethylsulfate, diethylsulfate, and propane sultone, so as to provide group $R_3$ in Formula I, as previously defined.

2. The process of claim 1 wherein the agent employed in step (d) is in an amount of from about 0.9 to about 1.2 moles of agent per mole of anthraquinone.

3. The process of claim 2 wherein said step (d) takes place at about 65° C.

4. The process of claim 1 wherein said inorganic base in step (c) is sodium carbonate or potassium carbonate.

5. The process of claim 4 wherein 1.0 to 1.2 moles of said inorganic base are employed per theoretical mole of the anthraquinone.

6. The process of claim 1 wherein said agent is dimethyl sulfate.

7. The process of claim 1 wherein $R_8$ is acetate and said acetylating agent is acetic anhydride or acetyl chloride.

8. A process for preparing a polymeric orange colorant represented by the structural formula:

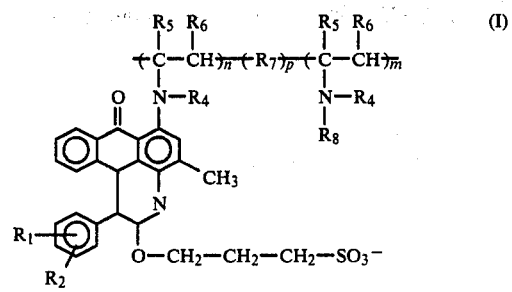

wherein $R_1$ and $R_2$ are independently selected from the group consisting of hydrogen, alkyl of 1 through 3 carbon atoms, alkoxy of 1 through 3 carbon atoms, sulfonate, halogen, and nitro; $R_4$, $R_5$ and $R_6$ are independently selected from the group consisting of hydrogen, methyl or ethyl; $R_7$ is selected from the group consisting of ethylene and ethylene sulfonate, ethylene phosphonate, ethylene phosphamate, ethylene sulfamate, acrylate and methacrylate; $R_8$ is hydrogen or acetyl; n is 10 to 2000; m is 0.3n to 5n; and p is 0 to 2(n+m), which process comprises the steps of (a) contacting an amine group containing polymer represented by the formula

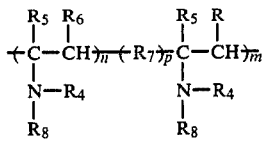

wherein $R_4$, $R_5$, $R_6$, $R_7$, m, n, and p are as previously defined and $R_8$ is hydrogen with an anthraquinone selected from those of the group represented by the formulae

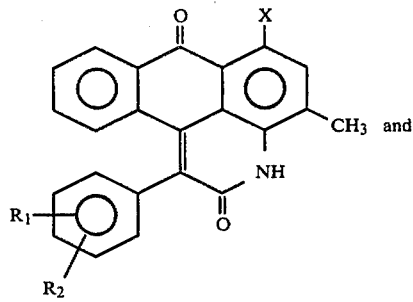

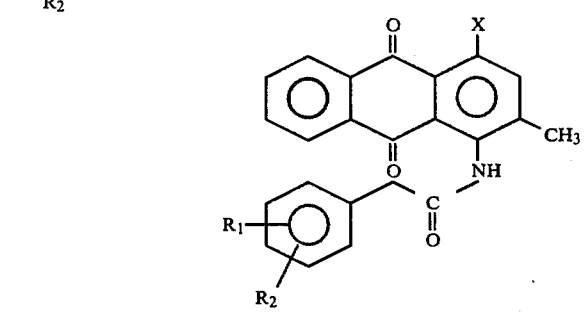

wherein $R_1$ and $R_2$ are as previously defined and X is bromo, chloro or iodo in the liquid phase in the presence of a catalytically effective amount of a copper catalyst selected from among copper metal, copper salts and copper oxides and at least one mole of a strong, inorganic base selected from among KOH and NaOH per mole of said anthraquinone at a temperature of about 60° C. to about 200° C. for about 0.2 to about 24 hours to form a polymeric red colorant represented by the formula

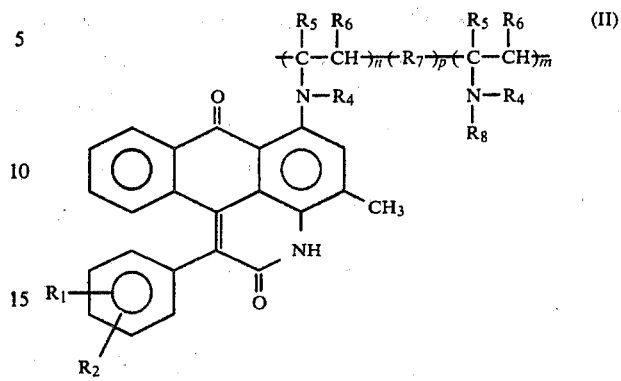

wherein $R_1$, $R_2$, $R_4$, $R_5$, $R_6$, $R_7$, m, n and p are as previously defined, (b) Optionally reacting the product of step (a) with an acetylating agent to form red polymeric dye of formula (II) wherein $R_1$, $R_2$, $R_4$, $R_5$, $R_6$, $R_7$, m, n and p are as previously defined and $R_8$ is acetyl, (c) Reacting the product of step (a) or (b) in aqueous liquid phase with inorganic base selected from sodium hydroxide, sodium carbonate, potassium hydroxide, and potassium carbonate, (d) Reacting the product from step (c) in an aqueous reaction medium selected from among water and water containing up to 25% of a water-miscible organic with from 0.9 to 1.2 moles of propane sultone per mole of chromophore moiety at from 50° to 100° C. for from 0.1 to 2 hours to form a polymeric colorant represented by formula (I) wherein $R_1$, $R_2$, $R_4$, $R_5$, $R_6$, $R_7$, $R_8$, m, n and p are as previously defined.

9. The process of claim 8 wherein $R_1$ is hydrogen and $R_2$ is hydrogen, chloro or methoxy.

10. The process of claim 8 wherein $R_5$ and $R_6$ are both hydrogen and $R_4$ is hydrogen or methyl.

11. The process of claim 8 wherein $R_7$ is ethylene sulfonate or the alkali metal salt thereof.

12. The process of claim 11 wherein $R_1$ and $R_5$ are all hydrogen; $R_2$ is hydrogen, chloro or methoxy; and $R_4$ is hydrogen or methyl.

13. The process of claim 12 wherein $R_1$, $R_2$, $R_4$, $R_5$ and $R_6$ are all hydrogen.

14. The process of claim 8 wherein $R_7$ is a carbon-carbon single bond.

15. The process of claim 14 wherein $R_1$, $R_5$, and $R_6$ are all hydrogen; $R_2$ is hydrogen, chloro or methoxy; and $R_4$ is hydrogen or methyl.

* * * * *